(12) United States Patent
Sproul et al.

(10) Patent No.: US 9,060,649 B2
(45) Date of Patent: Jun. 23, 2015

(54) INFUSER CUP

(75) Inventors: Nancy Sproul, San Carlos, CA (US); Michael Aten, San Carlos, CA (US)

(73) Assignee: Nantec, LLC, San Carlos, CA (US)

( * ) Notice: Subject to any disclaimer, the term of this patent is extended or adjusted under 35 U.S.C. 154(b) by 467 days.

(21) Appl. No.: 13/462,639

(22) Filed: May 2, 2012

(65) Prior Publication Data

US 2012/0279398 A1 Nov. 8, 2012

Related U.S. Application Data

(60) Provisional application No. 61/481,672, filed on May 2, 2011.

(51) Int. Cl.
*A47J 31/00* (2006.01)
*A47J 41/00* (2006.01)
*A47J 31/02* (2006.01)
*A47J 31/06* (2006.01)

(52) U.S. Cl.
CPC .............. *A47J 41/0061* (2013.01); *A47J 31/02* (2013.01); *A47J 31/0636* (2013.01); *A47J 31/0615* (2013.01)

(58) Field of Classification Search
CPC .............................. A47J 31/0636; A47J 31/02
USPC ............ 99/323, 317, 318, 319, 322; 210/474, 210/477
See application file for complete search history.

(56) References Cited

U.S. PATENT DOCUMENTS

| | | | | |
|---|---|---|---|---|
| 4,627,334 A | * | 12/1986 | Shanklin | 99/306 |
| 6,065,609 A | * | 5/2000 | Lake | 210/474 |
| 6,409,038 B1 | | 6/2002 | Karp | |
| 6,561,080 B1 | * | 5/2003 | Feeney | 99/319 |
| 6,901,847 B1 | * | 6/2005 | Shen | 99/323 |
| 7,895,939 B2 | * | 3/2011 | Pan | 99/322 |
| 8,234,971 B2 | * | 8/2012 | Cerroni | 99/287 |

* cited by examiner

*Primary Examiner* — Reginald L Alexander
(74) *Attorney, Agent, or Firm* — Kilpatrick Townsend & Stockton LLP

(57) ABSTRACT

An improved tea cup apparatus for facilitating the mixture of a fluid substance and a device to add lose tea or a tea bag in a cup. The apparatus preferably comprises of a built in cup with handle, tea storage and lid. This apparatus combined with a tea infuser is to allow the accessibility to mix water and tea in a cup. The first cylinder section is a cup in which fluid is stored and brewed. The second is a built in infuser for infusing tea into the cup. This devise is designed for the convenience of brewing tea in two step process.

4 Claims, 3 Drawing Sheets

INFUSER CUP

CROSS-REFERENCES TO RELATED APPLICATIONS

This application claims the benefit of U.S. Provisional Application Ser. No. 61/481,672 filed May 2, 2011, which is incorporated herein in its entirety.

BACKGROUND

Tea brewing with loose tea leaves typically requires a strainer that prevents the tea leaves and tea leaf particles from getting into the brewed tea drink. The strainer is typically a container that can be opened to receive the loose tea, closed, and then submerged in hot water, such that hot water can flow through the container and brewed tea can flow out, while the tea leaves and tea leaf particles are trapped in the container. Such a container is often referred to as a tea infuser. It is known to combine the tea infuser with a travel cup, utilizing a tea infuser that is located in the underside of the travel cup lid. The travel cup is filled with hot water such that the tea infuser portion of the lid underside is submerged in the hot water. Thus, the tea is brewed when the lid is closed onto the cup. Such infusers are continuously submerged in the tea drink; a practice that many tea drinkers claim imparts bitterness to the tea drink after several minutes.

BRIEF SUMMARY

Disclosed is an infuser and travel cup combination that stores the infuser in a base of the cup such that the infuser is easily removed after brewing and can be captured and stored in the base. The infuser is configured to hold the beverage material for brewing, such as tea leaves and loose tea leaf particles, without any particles getting into the brewed drink. Thus, the infuser is removed from the cup after the tea is brewed and is easily stored in the base for later replacement of the used tea leaves. Additional features allow the infuser to rest on the lid of the cup or to be completely submerged into the brewed beverage. A folding handle allows for easy insertion and removal of the infuser into the hot water, and the folding feature also allows the infuser to be easily stored in the cup base.

These unique design features allow the tea drinker to infuse tea as long as desired and then conveniently store the used infuser with the cup. Since the infuser can be easily inserted into the cup base and stored, the cup can still be used for traveling. A removable cup lid prevents hot liquid from spilling. The cup base storage feature and the special features on the strainer that allow for easy storage in the cup base while retaining flexibility in tea infusion provide convenient tea brewing with mobility and ease of use.

Other features and advantages of the present invention should be apparent from the following description of the preferred embodiment, which illustrates, by way of example, the principles of the invention.

DETAILED DESCRIPTION

Figure 1:
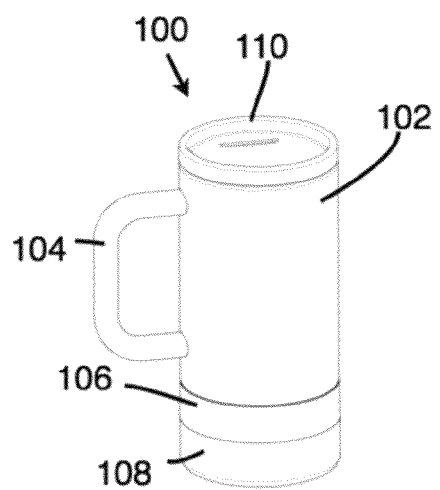
FIG. 1: Cup assembly with base and cap.

FIG. 1 shows a cup and infuser combination 100 constructed in accordance with the present invention, the combination including a cup body 102, handle 104, and two molded plastic base components comprising an upper cup base 106 and a lower cup base 108. The cup body comprises a vessel for containing a liquid, such as hot water for brewing a beverage. A lid 110 closes the top of the cup body 102. The combination 100 includes a beverage strainer assembly illustrated in FIG. 2.

Figure 2:
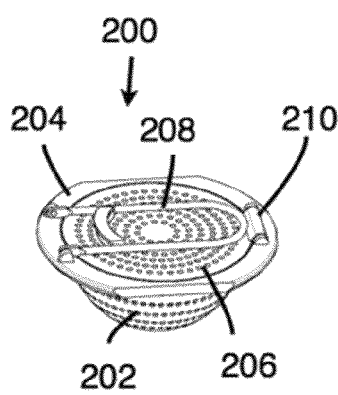
FIG. 2: Strainer with handle and lid folded shut for storage in the base of the cup.
Figure 3:
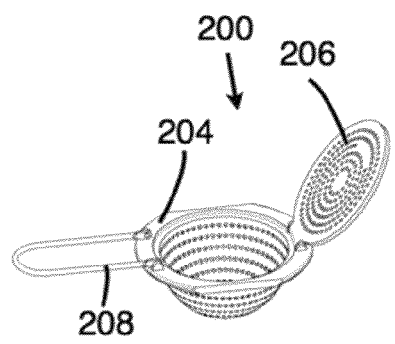
FIG. 3: Strainer with handle and lid both hinged open.

FIG. 2 and FIG. 3 show details of the beverage strainer assembly 200 comprising a strainer body 202 with a specially shaped flange 204, a hinged lid 206, and a hinged handle 208. The strainer assembly 200 is configured such that the built-in handle 208 allows the lid 206 to be easily opened and closed against the body 202. A snap construction provides a friction fit of the handle against the hinge 210 to maintain the lid in a closed condition. FIG. 3 shows that the hinged handle 208 and the hinged lid 206 are configured so as to allow the hinged handle to close over the hinged lid, providing a compact arrangement that aids in the easy storage of the strainer assembly 200. The strainer body 202 forms a compartment that can receive beverage material, such as tea leaves, which can be maintained in the body by the hinged lid 206 for brewing.

Figure 4:
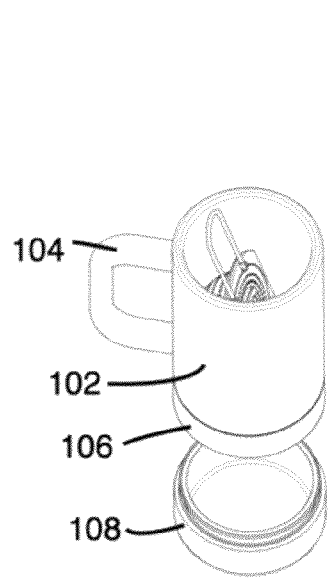
FIG. 4: Strainer inserted into cup.
Figure 5:
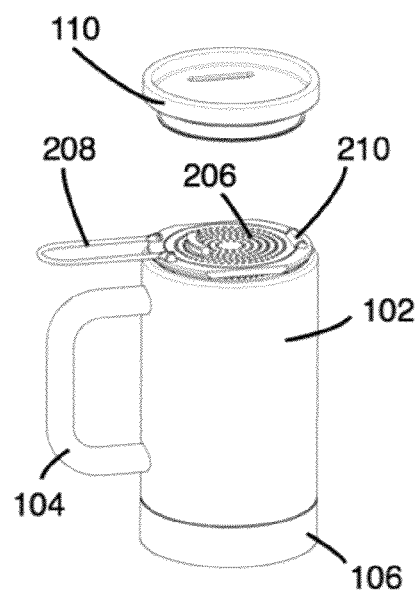
FIG. 5: Strainer resting on top of cup.

FIG. 2 and FIG. 3 show that the hinged handle 208 can swing open fully, to 180 degrees or more (FIG. 2), to a snap fit (FIG. 3), allowing the strainer to be easily inserted in the tea cup of the cup and tea strainer assembly 200 (FIG. 4). When the strainer assembly is placed in the cup body 202, the cup can be filled with hot water, allowing the strainer assembly 200 to be used for brewing the beverage. FIG. 4 shows the top rim 402 of the cup body 102. FIG. 5 shows that the specially shaped flange 204 of the strainer assembly 200 allows the strainer to rest on the top rim 402 of the cup. These special features allow for maximum flexibility of tea infusion to the user.

Figure 6:
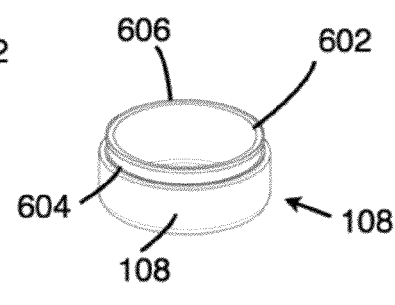
FIG. 6: Cup base with seal and features to provide strainer storage.

As noted above, the combination 100 (FIG. 1) includes an upper cup base 106 and a lower cup base 108. The two base components 106, 108 have features that allow for the storage of the strainer assembly. FIG. 5 shows that the upper cup base 106 is attached to the bottom of the cup. The upper cup base can be attached to the cup in a permanent coupling, or may be attached in a removable fashion. FIG. 6 shows the lower cup base 108 with an elevated portion 602 having threads 604 on a surface of the elevated portion such that the threads of the lower cup base can be screwed into matching threads on an inner rim at the bottom of the upper cup base 106 (not illustrated in FIG. 5). The top edge of the elevated portion 602 forms a generally flat, planar rim 606 providing a sealing surface against the upper cup base 106. In this way, the lower cup base 108 is removably attached to the underside of the upper cup base 106 with a threaded fastening mechanism. Other suitable attachment mechanisms will occur to those skilled in the art and can be provided on the upper cup base 106 and lower cup base 108, such as bayonet mounts and clips. In this way, the tea infuser can be received into the lower cup base 108, which in turn can be received into the upper cup base 106.

Figure 7:
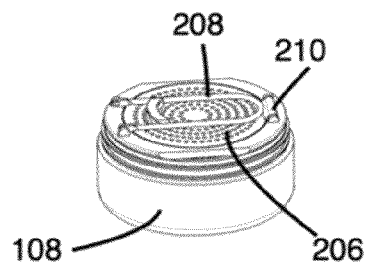
FIG. 7: Strainer being stored in cup base.

FIG. 7 shows that the lower cup base 108 has the elevated portion 602 that allows the tea strainer assembly to rest on it. A flexible seal runs around this elevated portion. The seal is configured to allow the lower cup base 108 to be pushed into the upper cup base and retained, either with or without the strainer assembly, such as illustrated in FIG. 1.

Figure 8:
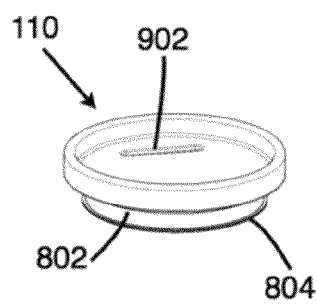
FIG. 8: Cup cap with seal.
Figure 9:
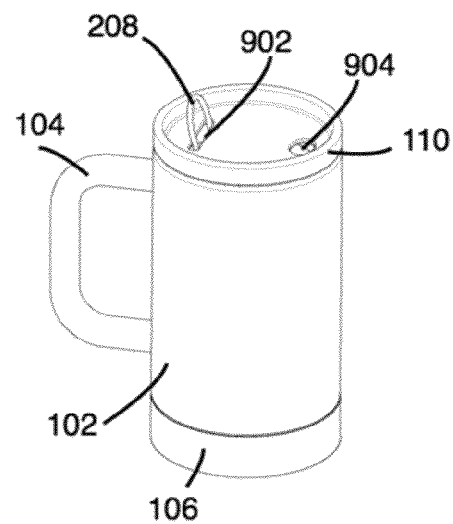
FIG. 9: Cap installed on cup with strainer handle protruding through special slot.

The cup cap 110 includes a flange 802 that is offset from the inner sidewall of the cup, as illustrated in FIG. 8. The flange retains a seal 804 of the same design as the seal in the lower cup base 108. This seal allows the cap to be inserted into the cup and held firmly in place without leaking. FIG. 9 shows a special slot feature 902 in the cap lid 110 allows the hinged open handle 208 of the tea strainer assembly to protrude through it. The slot 902 comprises an aperture through which the strainer assembly handle protrudes to locate the strainer assembly within the cup body, and serves to keep the hinged handle from inadvertently rotating into the hot water of the cup body while also functioning as a visual reminder that the strainer assembly is submerged in hot water. The slot 902 is provided in addition to a drinking aperture 904, through which the beverage in the cup body may be poured.

The present invention has been described above in terms of a presently preferred embodiment so that an understanding of the present invention can be conveyed. There are, however, many configurations for network access control systems not specifically described herein but with which the present invention is applicable. The present invention should therefore not be seen as limited to the particular embodiments described herein, but rather, it should be understood that the present invention has wide applicability with respect to network access control generally. All modifications, variations, or equivalent arrangements and implementations that are within the scope of the attached claims should therefore be considered within the scope of the invention.

What is claimed is:

1. An infuser cup comprising:
   a cup body comprising a vessel for a liquid, having a top rim and a bottom rim;
   a removable lower base configured to couple to the bottom rim of the cup body;
   a strainer assembly comprising a closable infuser container configured to mate with the top rim of the cup body;
   wherein the removable lower base is configured to receive the strainer assembly;
   the infuser cup further comprising:
      a hinged handle coupled to the strainer assembly;
      a removable lid configured to be attached to the cup body and including an aperture through which the handle of the strainer assembly protrudes to locate the strainer assembly within the cup body.

2. The infuser cup as claimed in claim 1, further comprising two apertures defined therein, comprising a slot aperture and a drinking aperture.

3. An infuser cup comprising:
   a cup body comprising a vessel for a liquid, having side walls and a bottom surface, said cup body further having
      a first removable portion that contains a half-cylindrical shaped strainer, said strainer including a hinged handle and being removable from the first portion only after the first portion containing the half-cylindrical shaped strainer is removed from the cup body, and
      a second removable portion of the cup body that is configured to contain a slot to receive the hinged handle of the half cylindrical shaped strainer and the half cylindrical shaped strainer;
   wherein the hinged handle is configured to be contained within the first removable portion, the first removable portion being removable itself such that the hinged handle extends into liquid that is contained in the cup when the hinged handle is inserted through the slot of the second removable portion.

4. The infuser cup as claimed in claim 3, wherein the second removable portion of the cup body further contains three slots, the three slots comprising a first slot configured to receive the handle and the body of the half cylindrical strainer, a second slot configured for liquid to pass through to facilitate drinking, and a third slot configured to equalize air pressure changes and facilitate drinking from the second slot.

\* \* \* \* \*